United States Patent
Baddaria

[11] Patent Number: 6,036,614
[45] Date of Patent: Mar. 14, 2000

[54] SPROCKET TOOTH WITH COMPLEX PROFILE JOINING PROXIMAL AND DISTAL TOOTH PORTIONS

[75] Inventor: Giuseppe Baddaria, Robbiate, Italy

[73] Assignee: Morse TEC Europe S.p.A., Italy

[21] Appl. No.: 09/044,582

[22] Filed: Mar. 19, 1998

[30] Foreign Application Priority Data

Jun. 18, 1997 [EP] European Pat. Off. .............. 97830289

[51] Int. Cl.[7] .............................. F16H 7/06; F16G 13/02
[52] U.S. Cl. ............................................. 474/155; 474/209
[58] Field of Search ................................... 474/152, 153, 474/155, 158, 159, 160, 206, 209

[56] References Cited

U.S. PATENT DOCUMENTS

| | | | |
|---|---|---|---|
| 1,383,402 | 7/1921 | Jones . | |
| 4,758,209 | 7/1988 | Ledvina | 474/156 |
| 5,345,753 | 9/1994 | Okuda et al. | 59/5 |
| 5,360,378 | 11/1994 | Suzuki et al. | 474/161 |
| 5,397,278 | 3/1995 | Suzuki et al. | 474/156 |

FOREIGN PATENT DOCUMENTS

| | | | |
|---|---|---|---|
| 53-052852 | 5/1978 | Japan | F16H 55/30 |
| 5231500 | 9/1993 | Japan | F16H 55/30 |
| 9-042423 | 2/1997 | Japan | F16H 55/30 |
| 17 28556A1 | 4/1992 | U.S.S.R. | F16H 7/06 |

*Primary Examiner*—David A. Bucci
*Assistant Examiner*—Matthew A. Kaness
*Attorney, Agent, or Firm*—Sidley & Austin; Greg Dziegielewski

[57] ABSTRACT

In a roller chain sprocket for a chain drive, the profile of each tooth comprises a proximal portion (AB), an intermediate portion (BC) and optionally a distal portion (CD). The proximal portion (AB) is shaped like an arc of a circle with a radius (r) at least as large as the radius ($r_r$) of each roller of the chain. The intermediate portion (BC) has a complex curvature defined by mathematical equations, whereas the optional distal portion (CD) is shaped like an arc of a circle with a radius R, equal to the pitch minus the radius of the roller.

5 Claims, 2 Drawing Sheets

SPROCKET TOOTH WITH COMPLEX PROFILE JOINING PROXIMAL AND DISTAL TOOTH PORTIONS

BACKGROUND OF THE INVENTION

The invention relates to sprockets for use with roller chains. Furthermore, the invention relates to a sprocket for use with roller chains to reduce noise related to chain and sprocket impacts as well as chordal motion. Moreover, the invention relates to a unique tooth profile of a sprocket which has a greater noise reduction than conventional sprockets.

Sprockets and roller chains are generally used in automotive transmissions, transfer cases and engine timing systems and the like. The sprockets currently used have various types of tooth profiles. For example, one widely used standardized type of sprocket has teeth with a pointed shape. The roots of this conventional sprocket have a profile shaped like an arc of a circle with a radius substantially corresponding to the radius of a roller of the chain and with a center of the roller radius located on the pitch circle of the sprocket.

In order to accomplish transmission of power, the teeth of the sprocket engage the rollers of the roller chain. Impact noise is generated as the rollers of the roller chain collide with and engage with the sprocket teeth of the sprocket. Additionally, noise is also generated by the vertical chordal motion of the chain as it engages the sprocket. This is due to the wrapping of the chain in a polygonal manner as it engages the sprocket. This wrapping causes the chordal action or vertical motion of the chain as it enters and exits the driving and the driven sprockets. The chordal action causes variations in the tension and the circumferential speed of the chain to occur as the chain is moving. As a result, fluctuation of the driving force on the driven shaft, angular velocity fluctuation of the driven shaft and increased noise are induced.

Previously there have been many attempts to reduce the noise in the operation of chains and sprockets. These various attempts in noise reduction included various designs to reduce the engagement or impact noise when the chain meets the sprocket as well as the noise generated by the chordal motion of the chain.

For example, silent chains have been utilized to reduce the noise generated by the chain and sprocket. Generally, these silent chains comprise of multiple link plates, each of which has a pair of inverted teeth and apertures. The links are interleaved or connected by connecting pins inserted in the apertures or pin holes. Each tooth of the link plate is composed of an inside flank and an outside flank. At least one flank of each tooth will engage with the sprocket teeth for the transmission of power to occur. The result is the transmission of power from the driving sprocket to the driven sprocket. Examples of silent chains can be found in U.S. Pat. No. 5,345,753, owned by the assignee of the instant invention.

Various modifications have been made to the silent chains themselves to further reduce the noise in the operation of the chain. For example, one type of silent chain utilizes links in a random arrangement of different configurations of the inside and outside flanks of the link plates. The shape or amount of protrusion of the inside flanks of the link plate teeth is made irregular in the lengthwise direction of the chain. In the alternative, the link for inner flank engagement and the link for the outer flank engagement are arranged randomly to achieve noise reduction. Another attempt to reduce the noise of the silent chain involved the modification of the engagement of the link plate and sprocket teeth. The number of link plate teeth that simultaneously engage the sprocket teeth is increased by either making the shape or amount of protrusion of the inside flanks of the link plate larger than that of the outside flank for all link rows.

In addition to changes to the chain and its structure to helps reduce the noise, modifications have also been made to the sprockets themselves in an effort to reduce the noise generated by the engagement of the chain and sprocket. For example in U.S. Pat. No. 4,758,209, the sprocket is formed of an even number of teeth with substantially equal radii and alternating tooth profiles. One tooth profile comprises outwardly converging flanks terminating in slightly rounded ends. The other tooth profile comprises involute curved flanks terminating in slightly rounded edges. This sprocket is used with block laced timing chains so that the outwardly converging flanks engage the inside flanks of the leading chain link teeth and the involute curved flanks engage the outside flanks of the trailing link teeth.

Another approach to reduction of noise in a chain drive mechanism can be found in U.S. Pat. No. 5,360,378. In this chain drive mechanism, rubber rings are provided on each of the side faces of a sprocket wheel. The rubber rings are coaxial with each other and the sprocket. The rubber rings do not come into contact with the chain as it rotates since there is a clearance between the peripheries of the rubber bodies and the inner edges of the pin link plates and the inner edges of the roller link plates.

U.S. Pat. No. 5,397,278, to Suzuki et al., describes the use of a sprocket for chains, such as conventional roller chains. The sprocket decreases the impact between the rollers of the roller chain and the sprocket during operation. The Suzuki et al., sprocket has a plurality of teeth with a bottom surface located between two adjacent teeth. Each tooth has a leading flank and a trailing flank. On the leading flank of one tooth and the trailing flank of the preceding tooth are two "meshing points" on which the roller of the chain seats without seating at the bottom of the root between the teeth. The distal surface of the leading face of a tooth, according to Suzuki et al., is defined by the envelope of circles of the same diameter as that of the rollers, which move according to a circumference that has a radius equal to the pitch between chain rollers and a center positioned in the center of a roller located in the adjacent space between teeth. Suzuki et al., do not address the noise due to the chain's chordal motion as the chain enters the sprocket.

This invention addresses the noise resulting from the operation of the chain and sprocket assembly by the design of the sprocket which addresses both impact noise and the noise generated by the chordal action of chain upon engagement with the sprocket. More particularly, the invention comprises a design for a sprocket tooth profile.

SUMMARY OF INVENTION

The present invention relates to a sprocket for use in a sprocket and chain assembly. The sprocket has a tooth profile that has a proximal portion and an intermediate portion. The proximal portion is shaped like the arc of a circle with a radius equal to or slightly greater than the radius of the chain rollers. The intermediate portion is defined by a complex line. The sprocket tooth profile may also include a distal portion formed according to an arc of a circle having a radius R, equal to the difference between the pitch of the chain rollers and the radius of a roller, and with the center corresponding to the center of a roller resting on the bottom of a space between adjacent teeth.

The sprocket of the instant invention allows the chain roller to come into contact with the sprocket teeth gradually, without a sudden impact, which reduces impact noise. Therefore, the collision or engagement noise of the chain during operation is expected to be reduced as compared to conventional sprockets and chains. Moreover, the design of the sprocket of the instant invention allows gradual engagement of the rollers of the chain and the wheel, while maintaining the tight strand portion of the chain at the same level with respect to the axis of the sprocket, and thus limiting or minimizing the vertical chordal motion of the chain. This allows the rollers of the chain and the sprocket wheel to mesh with a lead angle as compared to conventional assemblies and is calculated to reduce the noise associated with the chordal motion of the chain.

DETAILED DESCRIPTION OF THE PREFERRED EMBODIMENTS

Figure 1:
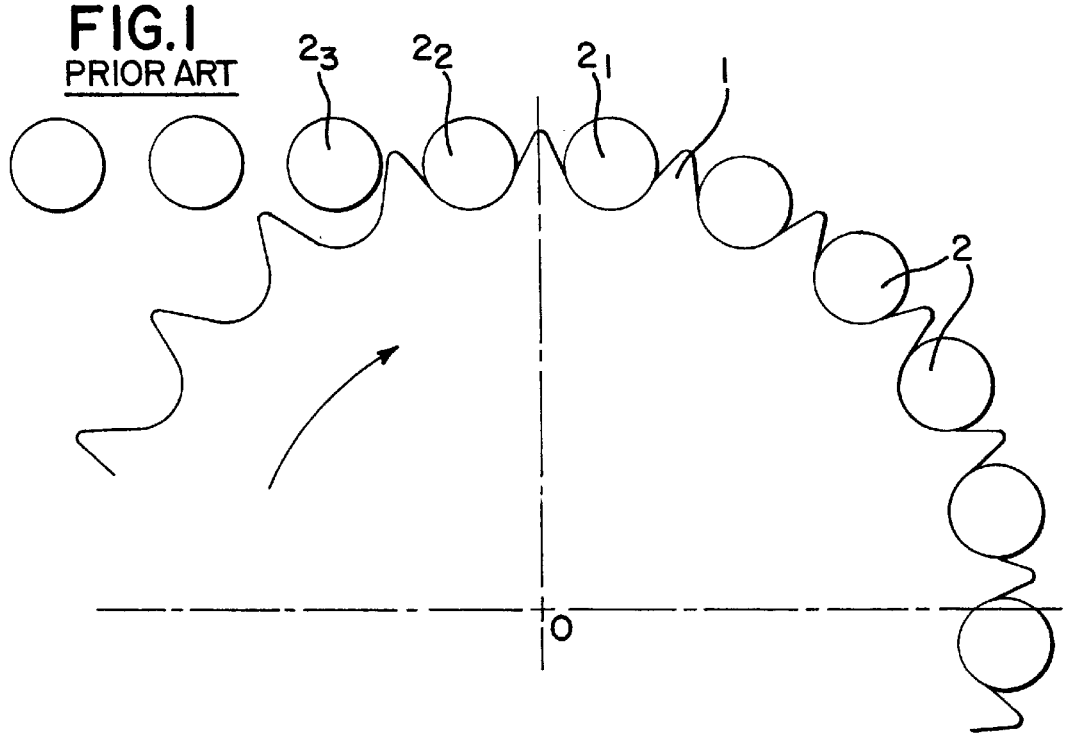
FIG. 1 is a schematic illustration of a conventional sprocket and roller chain of the prior art wherein the rollers of a portion of chain are shown engaged with the sprocket wheel.

FIG. 1 shows a conventional sprocket 1 for a roller chain. A conventional roller chain 2, with the individual rollers, enters and wraps around the sprocket. In particular, the rollers of the roller chain are referenced $2_1$, $2_2$, $2_3$, and so forth, indicating that $2_1$ meshes first with the sprocket, then $2_2$ and so on. Sprocket 1 rotates in a clockwise direction. As can be seen from the FIG. 1, as the sprocket rotates, the teeth of the sprocket contact the rollers 2 and the rollers seat at the bottom of the cavity between two successive teeth. This collision or engagement between the rollers and the sprocket teeth generates an impact noise. After a roller 2 as seated in a particular root or cavity formed between the two teeth 3 as shown in FIG. 1, the roller chain is raised and then lowered again as each successive roller enters the sprocket. This vertical or chordal motion causes variations in the tension and circumferential speed of the chain to occur. As a result, fluctuation of the driving force on the driven shaft, angular velocity fluctuation of the driven shaft and increased noise from chordal action are induced.

Figure 3:
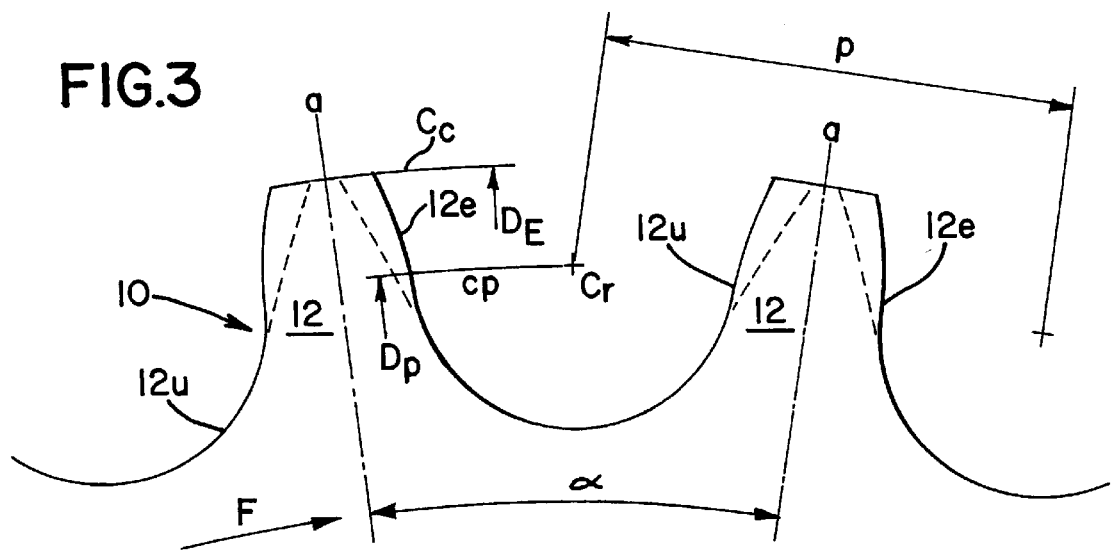
FIG. 3 is an enlarged view of a portion of the sprocket tooth profile according to the instant invention, compared with a portion of a conventional sprocket tooth profile which is drawn in the Figure with dashed lines.

The design of the chain sprocket tooth in accordance with the instant invention will be described below. In particular the new tooth profile for chain sprocket according to the present invention will be described. The new tooth profile of the instant invention is shown in FIG. 3. A conventional profile according to US ANSI standards is superimposed on the tooth profile of the instant invention in FIG. 3 in a dashed line.

Figure 2:
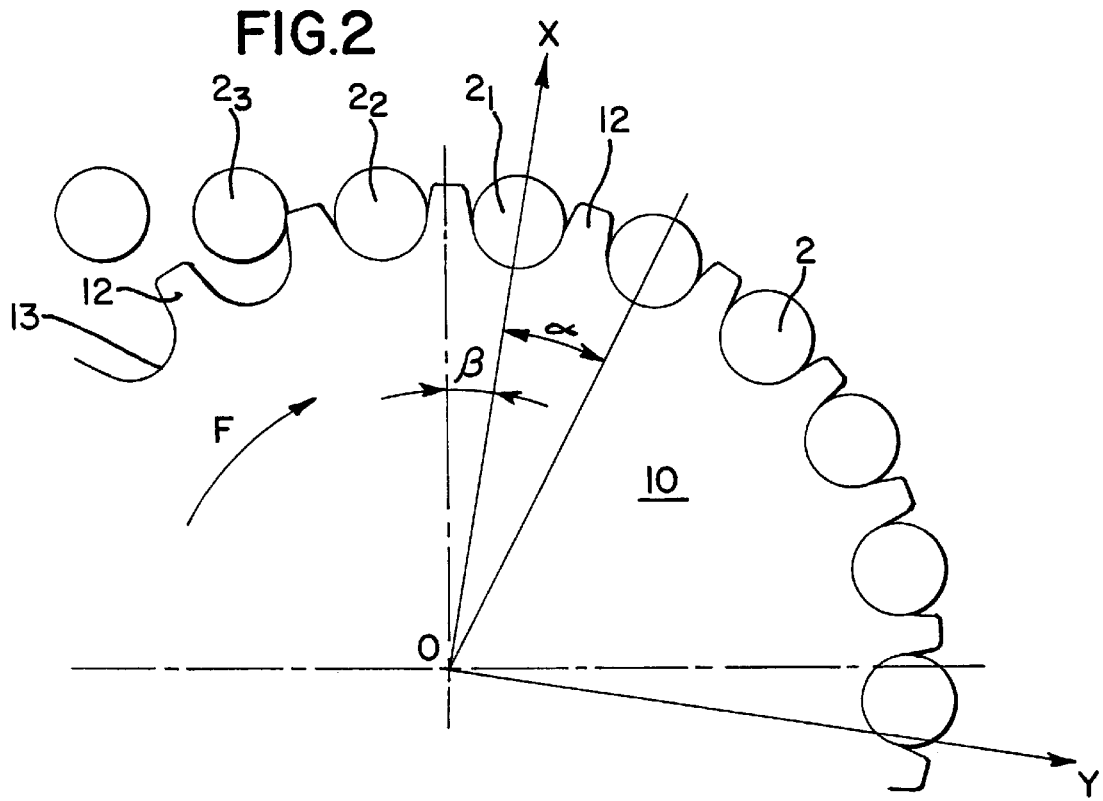
FIG. 2 is a schematic illustration of a sprocket according to the present invention, showing the engagement of the sprocket teeth with the rollers of a roller chain.
Figure 4:
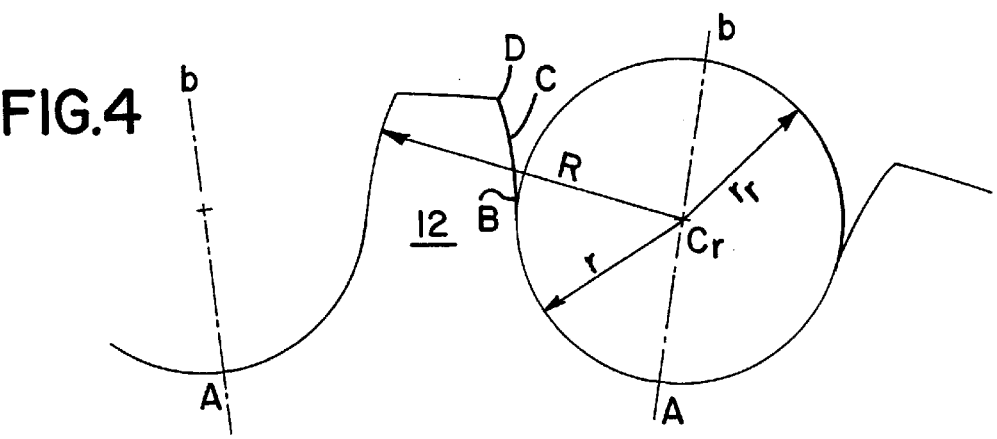
FIG. 4 shows an enlarged profile of a tooth of the sprocket wheel according to the present invention illustrating the location of a chain roller engaged with a sprocket of the sprocket.

As can be seen in FIGS. 2–4, the sprocket 10 has teeth 12 separated by root portion 13. As compared to the conventional sprocket teeth having the same number of teeth, the teeth 12 of the instant invention have a considerably wider or thicker distal portion, if such portion is included. FIG. 3 shows the teeth schematically which are defined below. The following parameters are used to define the profile of the teeth according to the instant invention:

p is the sprocket pitch, which is equal to the chain pitch or linear distance between the axes $C_r$ of two successive rollers of the chain;

$D_p$ is the pitch diameter of the sprocket, which is the diameter of the chain pitch circle $C_P$ defined by the centers of the rollers of the portion of the chain seated and wound around the sprocket;

$D_E$ is the diameter of the outer circle $C_E$ of the sprocket or maximum circle to the top of the sprocket teeth, which is defined by engineering standards;

α is the angle between the central radial axes a (or the radius extending from the sprocket center to the center of the teeth) of two successive teeth of the sprocket;

z is the number of teeth on the sprocket;

$r_r$ is the radius of a roller of the chain.

The sprocket of the instant invention rotates in the direction of the arrow F as shown in FIGS. 2 and 3. The leading profile 12e and the trailing profile 12u of a sprocket tooth are mirror images of each other. That is, each sprocket tooth is symmetrical with respect to a radial plane having as its track the radial axis a.

The profile of a tooth 12e according to present invention will now be described. With reference to a radial symmetry plane of the root or space 13 between two teeth (indicated with the axis b), for the profile 12e (or 12u) of a tooth 12 the following portions are defined and delimited by points A, B, C and D. Portion AB is called the proximal portion; portion BC the intermediate portion; whereas portion CD is designated the distal portion. Portion CD is optionally included in the tooth of the sprocket of the instant invention. However, portion CD of the tooth is not necessary to obtain the improved noise reduction as envisioned by the instant invention.

Point A is the intersection point where the axis of symmetry b of the root 13 between two teeth contacts the root of the tooth or bottom of the space formed by the teeth. Point B is the intersection between the pitch circle $C_p$ and the outside circumference or circle defined by a roller that rests in A. Point C is defined as the intersection between the distal curve or distal portion and the intermediate curve or portion. Point D is the meeting point of the profile 12e with the external circle diameter $D_E$.

The proximal portion AB of the tooth profile is an arc of a circumference with a radius r equal to or slightly greater than the radius $r_r$ of a roller of the chain, with the center $C_r$ on the intersection between the pitch circle and the axis b. The intermediate portion BC is defined by the following system of equations:

$$\begin{cases} f(x, y, \beta) = 0 \\ \dfrac{d}{d\beta} f(x, y, \beta) = 0 \end{cases} \quad 0 < \beta < \alpha$$

with:

-continued $$f(x, y, \beta) = \left\{ x - \left[ \left( R_p \cdot \sin\beta - \sqrt{-R\frac{2}{p} + 2R\frac{2}{p} \cdot \cos\beta - R\frac{2}{p} \cdot (\cos\beta)^2 + p^2} - (n-1) \cdot p \right) \cdot \cos(n \cdot \alpha - \beta) + R_p \cdot \sin(n \cdot \alpha - \beta) \right] \right\}^2 +$$

$$\left\{ y - \left[ -\left( R_p \cdot \sin\beta - \sqrt{-R\frac{2}{p} + 2R\frac{2}{p} \cdot \cos\beta - R\frac{2}{p} \cdot (\cos\beta)^2 + p^2} - (n-1) \cdot p \right) \cdot \sin(n \cdot \alpha - \beta) + R_p \cdot \cos(n \cdot \alpha - \beta) \right] \right\}^2 - r^2$$

wherein:
x and y are Cartesian coordinates defined with reference to a point of origin 0 on the axis of the sprocket; x extends along the radial symmetry axis of a cavity or space;

$R_p$ is the radius of the pitch circle of the sprocket: $R_p = \frac{1}{2} D_p$;

β is the angle that defines the position x of a first roller or cavity between the teeth with respect to the vertical center line of the sprocket;

n is the number of rollers meshing simultaneously on the sprocket, with n=1, 2, 3, 4, etc.;

whereas, α is the angle between the centers of two teeth and p is the pitch length or distance between the centers of two adjacent rollers.

Figure 5:
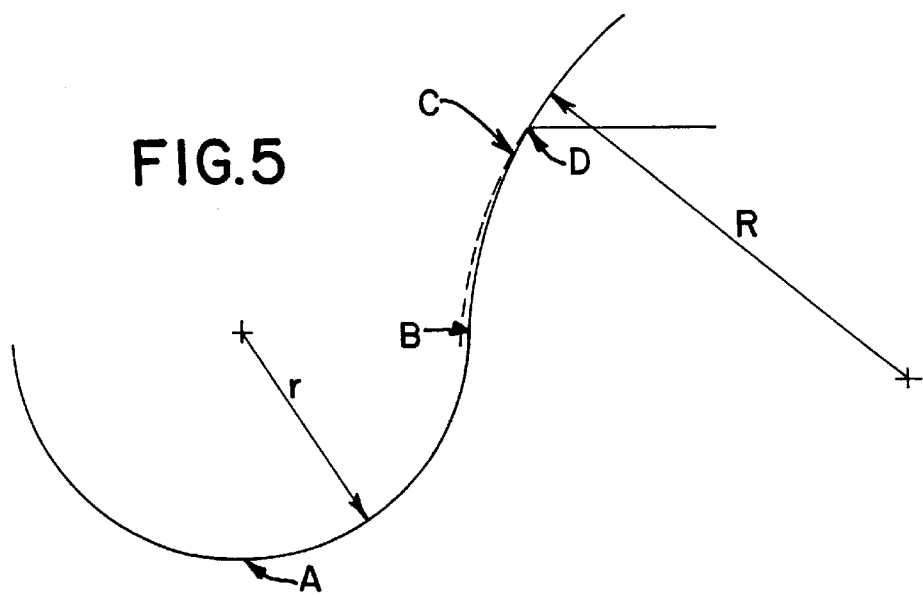
FIG. 5 shows an enlargement of the new tooth profile as illustrated in FIGS. 3 and 4 of the sprocket of the present invention.

The solution of the system by points, for various values of β, α and n, shows that the intermediate portion BC is a complex curve, made up of a series of portions of curves. In FIG. 5, one of the curves that makes up the intermediate portion BC is illustrated while the continuation of the distal portion CD with radius R is shown in dashed lines.

The distal portion CD is also optionally included in the formation of the teeth of the sprocket according to the instant invention. Distal portion CD is an arc of a circumference with a radius R equal to $(p-r_r)$. The distal portion CD is equal to the pitch of the sprocket (and of the chain) minus the radius of the roller with a center $C_r$, on the pitch circle and on the axis b of an adjacent space. The distal portion CD can have a beveled edge or a rounded edge in the vicinity of point D.

By defining the new profile of the sprocket in the manner as set forth above, the configuration allows the rollers of the roller chain and teeth to enter into contact with each other gradually as best seen in FIG. 2. Each roller, as it reaches the position $2_2$, is already well supported or seated on the tooth so as to avoid sudden impacts between the roller and the wheel. This design reduces the engagement or collision noise. Furthermore, it allows each roller to be supported in each stage of engagement with the sprocket substantially on the same line as the course of the tight portion of the chain, thus reducing or minimizing the vertical chordal action of the chain and the noise caused thereby.

The length of the distal portion CD of the profile according to the invention can be very small or even substantially nil. The objectives of the invention in reducing the collision noise as well as the noise due to the vertical chordal action can be achieved even with a sprocket in which the profile of the teeth comprises only the proximal portion AB and the intermediate portion BC without the distal portion. This alternative embodiment operates in a similar manner as the embodiment having the proximal portion, and intermediate portion.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet fall within the scope of the invention.

What is claimed is:

1. A roller chain and sprocket system, comprising:

a sprocket being defined by a pitch circle ($C_P$) and having a plurality of teeth equally spaced about its periphery, said teeth extending radially and being sufficiently spaced to accommodate the rollers of a roller chain therebetween, each of said teeth having side flank portions and top portions, said side flank portions of adjacent teeth being joined at an arc shaped root, said top portions being defined by a external sprocket circle diameter ($D_E$);

a roller chain having a plurality of rows of interleaved link plates, said link plates being connected by pin members to permit the articulation of said rows of interleaved link plates, each of said rows of link plates including rollers for contacting the teeth of said sprocket, each of said rollers having an outside circumference defined by a radius r;

each of said sprocket teeth side flank portions having a proximal portion (AB), an intermediate portion (BC), and a distal portion (CD), said proximal portion having an arc shape extending from the center (A) of said arc shape of said root to a point (B) along said side flank portion, said point (B) along said side flank portion being defined as the intersection of the sprocket pitch circle ($C_P$) and the outside circumference of said roller;

said distal portion (CD) having an arc shape extending from the top portion (D) of said tooth at said external sprocket tooth diameter ($D_E$) to an intersection point (C) along said side flank portion of said tooth, said intersection point (C) along said side flank portion being defined as a point along the arc formed from a radius of the difference between pitch length (p) and the roller radius ($r_r$) with a center ($C_r$) on the intersection of the pitch circle ($C_P$) and the centerline (b) of the adjacent root;

said intermediate portion (BC) having a complex arc shape that blends the proximal portion (AB) with the distal portion (CD) from said point (B) along said side flank portion to said intersection point (C), wherein said intermediate part (BC) of the tooth profile is defined with the following system of equations:

$$\begin{cases} f(x, y, \beta) = 0 \\ \dfrac{d}{d\beta} f(x, y, \beta) = 0 \end{cases} \quad 0 < \beta < \alpha$$

with:

-continued $$f(x, y, \beta) = \left\{ x - \left[ \left( R_p \cdot \sin\beta - \sqrt{-R_p^2 + 2R_p^2 \cdot \cos\beta - R_p^2 \cdot (\cos\beta)^2 + p^2} - (n-1) \cdot p \right) \cdot \cos(n \cdot \alpha - \beta) + R_p \cdot \sin(n \cdot \alpha - \beta) \right] \right\}^2 +$$

$$\left\{ y - \left[ -\left( R_p \cdot \sin\beta - \sqrt{-R_p^2 + 2R_p^2 \cdot \cos\beta - R_p^2 \cdot (\cos\beta)^2 + p^2} - (n-1) \cdot p \right) \cdot \sin(n \cdot \alpha - \beta) + R_p \cdot \cos(n \cdot \alpha - \beta) \right] \right\}^2 - r^2$$

wherein:

x and y are Cartesian coordinates defined with reference to a point of origin 0 on the axis of the sprocket, x extends along the axis of a cavity between the teeth;

p is the sprocket pitch and is equal to the linear distance between the axis $C_r$ of the successive rollers;

$R_P$ is the radius of the pitch circle of the sprocket, wherein $R_P = \frac{1}{2} D_P$ and is the pitch diameter, which is the diameter of the pitch circle $C_P$ defined by the centers of the rollers of the part of the chain wound around the sprocket wheel;

α is the angle between two consecutive teeth;

β is the angle that defines the position of a first roller or cavity between teeth with respect to x;

n is the number of rollers meshing simultaneously on the sprocket, with n=1, 2, 3, 4, and so forth.

2. The roller chain and sprocket system according to claim 1, characterized in that each face profile of the tooth is a mirror image of the other face profile.

3. The roller chain and sprocket system according to claim 2 wherein the distal portion coincides with the intermediate portion.

4. The roller chain and sprocket system according to claim 3, wherein said edge is rounded.

5. The roller chain and sprocket system according to claim 3 wherein said edge is beveled.

* * * * *